April 11, 1967  W. E. JEWETT  3,313,999
FIRING SIGNAL GATING CIRCUIT FOR POWER INVERTERS
Filed Dec. 30, 1963
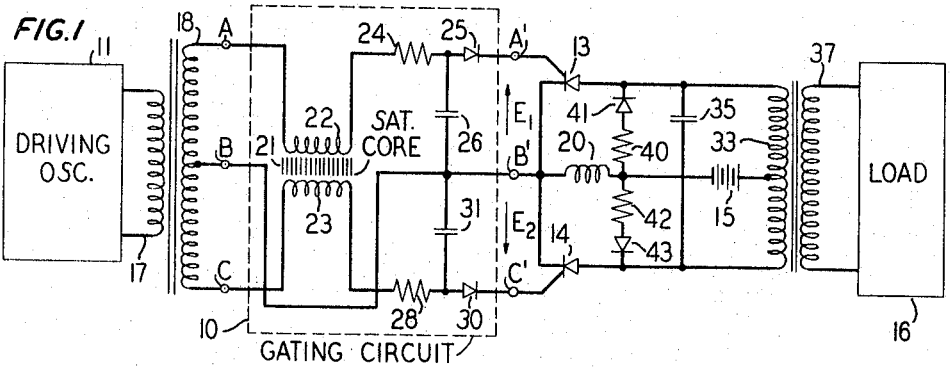
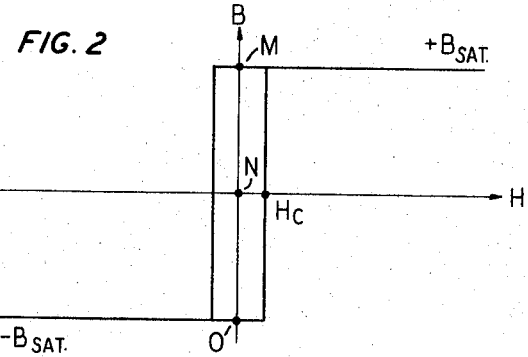
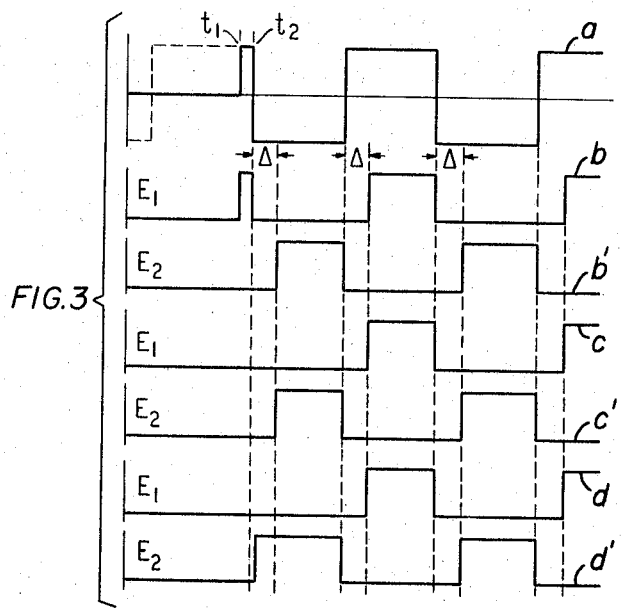
INVENTOR
W. E. JEWETT
BY Roy M. Porter Jr.
ATTORNEY

3,313,999
FIRING SIGNAL GATING CIRCUIT FOR POWER INVERTERS

William E. Jewett, Basking Ridge, N.J., assignor to Bell
Telephone Laboratories, Incorporated, New York, N.Y.,
a corporation of New York
Filed Dec. 30, 1963, Ser. No. 334,654
5 Claims. (Cl. 321—45)

This invention relates to electrical power conversion system and, more particularly, to D.-C. to A.-C. power inverters which employ thyratron like switching devices.

Because of their rugged current handling capabilities, ignitrons gas-filled thyratrons and, more recently, PNPN semiconductor switches have been widely used in power rectifiers and inverters. Functionally, these devices have much in common. Each has a control electrode and a transconductive or "major current" path. In each, current flow is initiated through the transconductive path by energizing the control electrode. Until a firing signal is applied to the control electrode, however, very little current flows even though the forward voltage applied across the transconductive path may be quite large. Once conduction has been established, the magnitude of current flow through the transconductive path may be quite large and is essentially independent of the signal applied to the control electrode. To stop conduction, the circuit which includes the transconductive path must be opened or the path itself must be shunted or reverse-biased for a sufficient period of time to allow the device to "recover."

Since conduction must be terminated by removing the forward voltage across the transconductive path, it is usual to employ thyratron-like devices with an A.-C. supply connected with the major current path. Thus, the applied voltage is reduced from forward values to reverse values once every cycle, and the current flow is stopped to allow the control electrode to regain control. This arrangement is used in controlled rectifier systems wherein the firing time of the thyratron-like device is varied to alter the average D.-C. output voltage from the rectifier.

Unfortunately, the required reverse turn-OFF voltages are not so readily obtainable in D.-C. to A.-C. power inverters. Unless some additional provision is made, a forward voltage would normally be applied across the switching devices at all times. It is desired to open and close the switching devices in phase opposition, the D.-C. current flowing first through one device and then through the other to produce an alternating current in the load circuit. The continuing forward voltage across the switching elements presents little trouble when vacuum tubes or transistors are used since turn-OFF may be accomplished by appropriately energizing the control electrode. Once a thyratron-like device conducts, however, any attempt to stop current flow through the transconductive path by way of the control electrode will prove to be ineffective. Accordingly, some means of "commutation" must be used to at least momentarily remove the forward potential from each switching device when the other starts to conduct. A commutating capacitor may be interconnected with the switching elements to perform this function. The voltage across this capacitor reverses each half-cycle. In one half-cycle the capacitor turns OFF one of the switching elements and in the next half-cycle, it turns OFF the other.

The commutating capacitor, in order to affect the turn-OFF of the switching elements, must reach a sufficient charge to reverse-bias the switch and maintain this back-voltage for a sufficient duration to allow the switch to recover. Since it takes a finite time to reverse the charge state of the commutating capacitor, the possibility exists that the nonconducting switch can be triggered ON before the capacitor has reached a sufficient charge to turn the conducting switch OFF. When this happens, both switches continue to conduct and the D.-C. source current rises to a value sufficient to damage the circuit.

Accordingly, it is an object of the present invention to insure that the firing signals which alternately trigger the thyratron-like device in an inverter are properly separated in time for both transient and steady-state conditions. It is a concomitant object of the invention to improve the reliability of inverter circuits which use thyratron-like switching elements.

In order to provide a stable output frequency from a power inverter, the switching elements must be actuated by a stable driving signal. The transistor-core oscillator with a regulated D.-C. input voltage may be used to generate the desired firing signal, and the transistor-core oscillator is particularly desirable when frequency regulation and multiphase operation are required. This form of signal generator, which is described by J. L. Jensen in the article entitled "An Improved Square-Wave Oscillator Circuit," which appeared in the September 1957 issue of I.R.E. Transactions on Circuit Theory, is both simple and inexpensive, yet quite stable when operated from a constant voltage D.C. source. With this and other forms of external driving signal generators, however, improper triggering is quite likely to occur during the start operation. This happens whenever the second triggering signal is generated too soon after the first triggering signal is generated. When the $(n+1)$th triggering signal follows the $n$th triggering signal too closely in time there will be insufficient time for the commutating capacitor to attain sufficient charge to "commutate" the thyratron-like switching elements. The conventional practice in the past has been to make successive attempts until the inverter starts properly. Clearly, this procedure is always inconvenient and, in some applications, impossible.

Accordingly, it is a further object of the present invention to provide fault-free starting of a power inverter which is actuated in response to an external source of firing signals which may occasionally be spaced too closely in time.

In a principal aspect, the present invention takes the form of a gating circuit for preventing the failure of a D.-C. to A.-C. inverter due to premature triggering of one of the thratron-like switching devices. In accordance with a principal feature of the invension, triggering signals are delivered from an external source to the control electrode of each thyratron-like switching device by way of a saturable reactor. According to the invention, a turn-ON signal can be delivered to one of the switches only when the core of the saturable reactor is saturated in a first sense and to the other switch only when the core is saturated in the opposite sense. The possibility of prematurely triggering either switch is eliminated since the core must absorb a predetermined number of average volt-seconds between the occurrence of each firing signal. The invention allows the use of a simple, unsynchronized firing signal source by eliminating any tendency to misfire during the starting transient.

Other objects, advantages and characteristic features of the invention will become more apparent from a consideration of the following detailed description and the accompanying drawings. In the drawings, FIG. 1 schematically illustrates an embodiment of the invention;

FIG. 2 depicts an illustrative magnetization curve for the saturable core reactor used in the embodiment shown in FIG. 1; and FIG. 3 shows typical waveforms illustrative of the operation of the circuit shown in FIG. 1.

In the embodiment of the invention shown in FIG. 1 of the drawings, a magnetic gating circuit 10 is interposd between the firing signal source 11 and the thyratron-like PNPN devices 13 and 14 of a standard parallel inverter. The inverter converts the direct-current voltage appearing across the battery 15 into an alternating-current voltage which is delivered to the load 16. The parallel inverter itself is well known in the art and is shown, for example, in the second addition of the G.E. Silicon Controlled Rectifier Handbook, Fig. 9.34 (1961). The conventional practice in the art has been to drive the thyratron like switches directly from the triggering signal source. This may be illustrated by visualizing a direct connection between terminals A and A', B and B', and C and C'. As will be seen, however, the use of the gating circuit as contemplated by the present invention prevents failure of the inverter circuitry caused by improperly spaced trigger signals.

In the embodiment of the invention pictured in FIG. 1 of the drawings, a square wave triggering signal is developed at the output of the driving oscillator 11 and applied directly to the primary winding 17. This square wave voltage is then induced in the secondary winding 18 which is provided with a center tap terminal B and end terminals A and C. The center tap terminal B is connected directly to the negative terminal of the direct-current source 15 through a ballast inductor 20; that is, terminal B is connected directly to terminal B'. The magnetic gating circuit 10 includes a saturable core reactor having a pair of windings 22 and 23. Terminal A of secondary winding 18 is connected to the control electrode of PNPN device 13 through the series combination of winding 22, a resistance 24, and a diode 25. Diode 25 is poled in a direction appropriate for allowing positive current flow from terminal A to the control electrode of PNPN device 13. A capacitor 26 is connected from the junction of resistance 24 and diode 25 to the center tap terminal B. A congruent configuration of elements comprising winding 23, resistance 28, diode 30 and capacitor 31 is connected between the end terminal C of secondary winding 18 and the control electrode of the PNPN device 14.

The power inverter itself includes a primary winding 33 having a center tap connection which is directly connected to the positive terminal of source 15. One end of the primary winding 33 is connected back to the negative terminal of source 15 through the series combination of the transconductive path of PNPN device 13 and the ballast inductor 20. The other end of primary winding 33 is connected through the transconductive path of PNPN device 14 and the ballast inductor 20 to the negative terminal of source 15. A commutating capacitor 35 is connected across winding 33. The inverter operates to induce an alternating-current voltage in secondary winding 37, this alternating-current voltage being applied to the load 16. The inverter circuit is also provided wtih a pair of auxiliary discharge paths for the commutating capacitor 35. The first of these paths comprises the series combination of a resistance 40 and a diode 41 connected between the negative terminal of source 15 and the anode of the PNPN device 13. The second auxiliary discharge path comprises resistance 42 and diode 43 which are connected in series between the negative terminal of source 15 and the anode of PNPN device 14.

Before explaining the operation of the magnetic gating circuit 10 as contemplated by the present invention, it will be helpful to first consider the operation of the power inverter itself. For this purpose, it may be assumed that the square wave voltage appearing across winding 18 is applied directly (as it would be if terminals A and A', B and B', and C and C' were directly connected).

First, suppose that the PNPN device 13 is conducting and the PNPN device 14 is not. Current then flows from the positive terminal of source 15 into the center tap of primary winding 33, through the upper half of primary winding 33, through the transconductive path of PNPN device 13 and the ballast inductor 20, back to the negative terminal of the source 15. The anode of PNPN device 14 is driven highly positive at this time by autotransformer action and the capacitor 35 charges toward a value approximately equal to twice the voltage from source 15. After a period of time, therefore, the commutating capacitor will reach a substantial state of charge. At this time, when a firing pulse is delivered to the control electrode of PNPN device 14, that device begins to conduct and the commutating capacitor begins to discharge through device 14, the ballast inductor 20, and the discharge path comprising resistance 40 and diode 41. There is also a discharge path through the transformer winding 33, but the discharge time through this path is considerably longer than that through the auxiliary path provided by resistance 40 and diode 41.

Note that at the moment the PNPN switch 14 began to conduct, the capacitor 35 was effectively connected in parallel with the previously conductive PNPN device 13, thereby applying the reverse capacitor voltage across diode 13, turning it off. The element values of the commutating capacitor 35, the shunt inductor 20, and the resistance 40 are chosen such that PNPN device 13 is reverse biased just slightly longer than its recovery time. For those silicon PNPN devices now in common use, the recovery time does not usually exceed 25 microseconds.

While the commutating capacitor is discharging through the PNPN device 14, the ballast inductor 20, resistance 40, and diode 41, the discharge current is initially zero, builds up sinusoidal to some maximum value and then begins to fall toward zero again. However, when the discharge current begins to fall, a voltage is induced in the ballast inductor 20 such that the cathodes of the PNPN devices 13 and 14 become even more negative than the negative terminal of source 15. Thus, the discharge oscillation is damped out through the series combination of resistance 42, diode 43 and the PNPN device 14.

It should also be noted that when load 16 exhibits a substantial inductive reactance, the load current and hence the current in primary winding 33 cannot instantaneously reverse. Thus, after commutation is completed, reactive current from the load may be returned to the power source through the lower half of winding 33, resistance 42 and diode 43. Between the time the commutation oscillation is completely damped out after PNPN device 14 is triggered on and the time at which the load current falls to zero, neither PNPN device 13 nor PNPN device 14 carries any current. Thus, PNPN device 14 must be refired when the load current reverses. As will be seen from the description to follow, the gating circuit as contemplated by the present invention furnishes constant triggering current rather than a short duration pulse to insure proper firing when a reactive load is connected to the inverter output.

At the instant of initial turn on, neither switch is conducting, thus no capacitor charge is required to turn a switch off. However, after this initial turn on, if one of the switches in the parallel inverter is ever fired before the commutating capacitor has had an opportunity to reach a sufficient charge, both switches will conduct simultaneously. Should this happen, the current from source 15 will rise to a value sufficient to damage the circuit. Improper firing is particularly likely to occur at the time the inverter is started. Suppose, for example, that a waveform of the type shown in FIG. 3 of the drawings is developed by the driving oscillator 11. This waveform would be typical of that generated by a transistor-core oscillator when the initial flux in the saturating core of the oscillator is close to its positive or negative saturation value when the power supply is turned on. As shown in curve $a$ of FIG. 3, the power supply might be turned at time T1 and, shortly thereafter at time T2, the driving waveform reverses polarity. If the driving waveform shown in curve $a$ of FIG. 3 were applied directly to the control electrodes of PNPN devices 13 and 14, device 13 would conduct at time T1 but, since the difference between times T1 and T2 is so short, the commutating capacitor 35 might not reach a sufficient state of charge to cause PNPN device 13 to recover when PNPN device 14 is turned on at time T2. Thus, both switches would conduct and the D.-C. source current would rise until the circuit is damaged (or until a circuit breaker opened). It is the purpose of the gating circuit according to the present invention to insure against the turning on of either thyratron-like switch before the commutating capacitor has sufficient charge to turn the other switch off.

The gating circuit 10 shown in FIG. 1 of the drawings should be considered in conjunction with the magnetization curve of the saturable core 21. FIG. 2 of the drawings shows an illustrative curve. When the core 21 is unsaturated, the impedance presented by windings 22 and 23 is quite high. Some excitation current does flow, however, and the capacitors 26 and 31 provide a current path which prevents this excitation current from firing the PNPN devices.

Curves $b$, $b'$, $c$, $c'$, $d$ and $d'$ of FIG. 3 illustrate that, regardless of the initial state of magnetic flux in the core 21, improper triggering is precluded. Suppose first that the core 21 is saturated in a positive direction; that is, the core is at point M on the magnetization curve shown in FIG. 2. Assume that the waveform $a$ of FIG. 3 is developed by the oscillator 11. Since the winding 18 initially drives point A positive with respect to the center tap point B, and since the core is already saturated in a positive direction, current flows from point A through winding 22 charging the capacitor 26 and delivering the voltage E1 as shown in curve $b$ of FIG. 3. It may be noted that the waveforms shown in FIG. 3 are somewhat idealized since they disregard the wave shaping contributed by the charge time constant of capacitor 26 and resistance 24 as well as resistance 28 and capacitor 31. This is a valid idealization for these time constants are very small. At time T2 when the voltage across winding 18 reverses, point C becomes positive with respect to point B and this voltage is applied across the winding 23. Since the core 21 is saturated in a positive direction, current is prevented from flowing through winding 23 until the core saturates in the opposite direction. To reverse the state of saturation of core 21 takes a predetermined number of average volt-seconds introducing the time delay $\Delta$ as shown in curve $b'$ of FIG. 3. Thus, at time $t_2 + \Delta$ the voltage E2 rises, turning on the PNPN switch 14. In curves $b$ and $b'$ of FIG. 3, it can be seen that the delay time $\Delta$ must elapse in each subsequent half cycle between the time one of the switches has a gating voltage in the direction to turn it on, and the time the other switch has a gating voltage in the direction to turn it on. Note that the signal developed by driving oscillator 11 must have sufficient volt-second area in each half-cycle to reverse the direction of saturation and, after saturation is accomplished, the signal must have sufficient amplitude to fire the devices 13 and 14.

If the flux in core 21 was initially zero, (point N on the magnetization curve of FIG. 2), the gating circuit 10 would still prevent improper firing as illustrated by curves $c$ and $c'$ of FIG. 3. In this condition, the initial positive pulse from time $t_1$ to time $t_2$ is blocked by the core 21 altogether. If the core 21 was saturated in a negative direction (point O on the magnetization curve of FIG. 2), the initial positive pulse between time $t_1$ and time $t_2$ would be blocked. However, as shown in curves $d$ and $d'$ of FIG. 3 the voltage E2 would rise shortly after time $t_2$ since only a small flux change in the core 21 would be necessary.

Using conventional techniques of circuit analysis, a relation may be derived which defines $\Delta$, the time required to switch the core from one state of saturation to the other. That relation is:

$$\Delta = +\frac{CE}{K} - RC + \sqrt{\left(RC - \frac{CE}{K}\right)^2 - \frac{4CN\phi_{sat}}{K}}$$

where

C is the capacity of each of the capacitors 26 and 31 (all other capacitance in the timing circuit is assumed to be lumped into these capacitors);

R is the resistance of each of the resistors 24 and 28 (all other resistance in the timing circuit is assumed to be lumped into these resistors);

E is the transformer voltage as it appears across each half of winding 18;

N is the number of turns in each of the windings 22 and 23;

$\phi_{sat}$ is the magnitude of flux necessary to saturate core 21; and, $$K = \frac{H_c L}{.4\pi N}$$

$H_c$ being the coercive force determined from the B–H loop of the core material used for core 21, and L being the length of the mean magnetic path of core 21.

The above relation assumes that there is negligible shunting of the capacitors 26 and 31 due to leakage currents through the gate electrodes of the PNPN devices 13 and 14.

As discussed earlier, the value $\Delta$ as given by the equation must be large enough to allow the commutating capacitor 35 in the power inverter to recharge sufficiently for proper commutation. It should be noted that, before the core 21 saturates, the voltage across each of the capacitors 26 and 31 must be held to a value below that required to fire the PNPN devices. Otherwise, firing might occur due to the flow of excitation current. With the diodes 25 and 30 connected in series with the gate electrodes as shown in FIG. 1, voltages smaller than the forward breakdown potential of these diodes cannot supply a turn-on signal to the PNPN switches. The voltages existing across each of the capacitors before saturation may be reduced by decreasing the exciting current through the windings 22 and 23 or by increasing the capacitance of the capacitors 26 and 31.

It is to be understood that the description given above is merely illustrative of an application of the principles of the invention. Numerous other arrangements could be devised by those skilled in the art without departing from the true spirit and scope of the invention.

What is claimed is:

1. Power conversion apparatus comprising, in combination, a direct-current input circuit, an alternating-current output circuit, first and second thyratron-like switching devices each having a control electrode and a transconductive path, means for connecting said transconductive paths between said input circuit and said output circuit, a source of a periodic waveform having first and second balanced output terminals, a first and a second winding affixed to a common saturable core, first circuit means for connecting said first winding between said first output terminal and the control electrode of said first switching device, and second circuit means for connecting said second winding between said second output terminal and the control electrode of said second switching device.

2. Apparatus as set forth in claim 1 wherein both said first and said second circuit means include a shunt-circuit path for preventing the flow of excitation currents to said control electrodes when said core is unsaturated.

3. In combination, a power inverter circuit having a pair of thyratron-like switching devices arranged to conduct alternately to convert direct-current energy into alternating-current energy, each of said devices having a control electrode and a transconductive path, commutation means interconnected with said inverter for applying a reverse turn-off voltage across the transconductive path of one of said devices when the other of said devices becomes conductive, a source of a periodic firing signal, a saturable core reactor, and means for connecting said reactor between said source and said control electrodes such that turn-on signals can be delivered to the control electrode of one of said devices only when the core of said reactor is saturated in a first sense and to the control electrode of the other of said devices only when said core is saturated in the opposite sense.

4. In combination with power conversion apparatus utilizing at least a first and a second thyratron-like switching device each having a control electrode, a source of firing signals for said devices which comprises, in combination, a source of a periodic waveform having first and second output terminals, first and second windings affixed on a common saturable core, means for connecting said first winding between said first output terminal and the control electrode of said first thyratron-like device, and means for connecting said second winding between said second output terminal and the control electrode of said second thyratron-like device.

5. In combination, a transformer having primary and secondary windings, said primary winding having first and second end connections and a center-tap connection, a two-terminal source of a direct-current potential, means for connecting one terminal of said source to said center-tap connection, means including a first thyratron-like switching device for connecting the other terminal of said source to said first end connection, means including a second thyratron-like switching device for connecting said other terminal of said source to said second end connection, a commutating capacitor connected between said first and second end connections, a source of a periodic waveform having first and second output terminals, first and second windings wound on a common saturable core, first circuit means for applying signals appearing on said first output terminal through said first winding to initiate conduction through said first thyratron-like switching device whenever said core is saturated in a first direction, and second circuit means for applying signals appearing on said second output terminal through said second winding to initiate conduction through said second thyratron-like switching device whenever said core is saturated in a second direction, the time required to change the flux in said core from saturation in said first direction to saturation in said second direction being larger than the time required to reverse the charge on said commutating capacitor.

References Cited by the Examiner

UNITED STATES PATENTS

| | | | |
|---|---|---|---|
| 2,809,303 | 10/1957 | Collins. | |
| 3,119,058 | 1/1964 | Genuit | 321—47 X |
| 3,120,633 | 2/1964 | Genuit | 321—47 X |
| 3,120,634 | 2/1964 | Genuit | 321—47 X |
| 3,242,413 | 3/1966 | Hardies | 321—18 |
| 3,244,962 | 4/1966 | Genuit | 321—25 X |
| 3,246,226 | 4/1966 | Geisler et al. | 321—45 X |

FOREIGN PATENTS 935,235  8/1963  Great Britain.

JOHN F. COUCH, *Primary Examiner.*

W. M. SHOOP, *Assistant Examiner.*